(12) United States Patent
Chistyakov

(10) Patent No.: US 8,529,165 B2
(45) Date of Patent: Sep. 10, 2013

(54) TOOL ASSEMBLY AND TOOL HOLDER THEREFOR HAVING AN ELASTIC MEMBER

(75) Inventor: Sergey Chistyakov, Nahariya (IL)

(73) Assignee: Iscar, Ltd., Tefen (IL)

( * ) Notice: Subject to any disclaimer, the term of this patent is extended or adjusted under 35 U.S.C. 154(b) by 230 days.

(21) Appl. No.: 13/115,746

(22) Filed: May 25, 2011

(65) Prior Publication Data

US 2011/0293382 A1 Dec. 1, 2011

(30) Foreign Application Priority Data

May 26, 2010 (IL) .......................................... 205988

(51) Int. Cl.
*B23B 29/14* (2006.01)

(52) U.S. Cl.
USPC ............................................ 407/70; 407/107

(58) Field of Classification Search
USPC ................. 407/107, 108, 109, 110, 111, 106, 407/102, 70
See application file for complete search history.

(56) References Cited

U.S. PATENT DOCUMENTS

| | | | |
|---|---|---|---|
| 3,323,192 A | | 6/1967 | Wallace |
| 3,371,567 A | | 3/1968 | Wayne |
| 3,693,224 A | * | 9/1972 | Bartoszevicz ................. 407/111 |
| 4,169,690 A | * | 10/1979 | Kendra ............................ 407/90 |
| 4,738,570 A | * | 4/1988 | Wertheimer ..................... 407/50 |
| 5,031,492 A | * | 7/1991 | Zinner ............................. 82/158 |
| 6,146,062 A | * | 11/2000 | Jansson .......................... 407/107 |
| 6,612,207 B2 | * | 9/2003 | Schiffers ......................... 82/1.11 |
| 7,597,508 B2 | * | 10/2009 | Hecht ............................ 407/101 |
| 2001/0022123 A1 | | 9/2001 | Schiffers |
| 2010/0158622 A1 | * | 6/2010 | Kaufmann .................... 407/107 |

FOREIGN PATENT DOCUMENTS

| | | |
|---|---|---|
| DE | 19727872 A1 | 1/1999 |
| DE | 102008038272 A1 | 2/2010 |

OTHER PUBLICATIONS

International Search Report dated Sep. 6, 2011 issued in PCT counterpart application (No. PCT/IL2011/000384).

* cited by examiner

*Primary Examiner* — Andrea Wellington
*Assistant Examiner* — Nicole N Ramos
(74) *Attorney, Agent, or Firm* — Womble Carlyle

(57) ABSTRACT

A multi-grooving tool holder for holding cutting members seated in a side-by-side formation in a clamping portion of the holder. The clamping portion includes an upper clamp and a lower clamp and an elastic member is located in one of the upper and lower clamps. When cutting members are assembled in the clamping portion, the elastic member engages the cutting members and aligns each cutting member independently, by applying a force, and consequently a moment on the cutting members.

16 Claims, 3 Drawing Sheets

TOOL ASSEMBLY AND TOOL HOLDER THEREFOR HAVING AN ELASTIC MEMBER

FIELD OF THE INVENTION

The present invention relates to multi-grooving tools.

BACKGROUND OF THE INVENTION

Multi-grooving, or multi-parting tools as they are sometimes referred, are capable of simultaneously cutting multiple grooves in a work piece. These tools have multiple replaceable cutting inserts, or cutting insert holders held in a tool holder in a side-by-side formation. Since sometimes the application demands a large number of simultaneous grooves, it is required that the cutting inserts or insert holders are accurately aligned with respect to one another. Furthermore, it is known that cutting edge wear in this arrangement may be asymmetrical. Therefore, since each cutting insert is replaced individually, repeatability is also a requirement. One common way to achieve an accurate alignment is by grinding the cutting edges of the cutting inserts after the cutting tool is assembled and the cutting inserts are each secured in place. This is a disadvantage, since grinding is expensive.

Another way of achieving alignment and repeatability in multi-grooving tools is by using adjusting mechanisms, such as a wedge adjustment mechanism, for each cutting insert. In this arrangement, the accurate location of each cutting insert or tool holder is set via a turn of a screw. This process may be time consuming and of low accuracy, since it is done by hand.

SUMMARY OF THE INVENTION

In accordance with the present invention there is provided a tool holder for holding multiple cutting members seated in a side-by-side formation in a clamping portion of the tool holder. The clamping portion includes upper and lower clamps and an elastic member is located in one of the upper and lower clamps.

In accordance with the present invention there is further provided a tool assembly which includes a tool holder and cutting members seated in a side-by-side formation in a clamping portion located at a forward end of the tool holder.

The clamping portion includes upper and lower clamps and an elastic member located in one of the upper and lower clamps.

The lower clamp includes a top surface which has a protrusion with a protrusion abutment surface and the upper clamp includes an upper clamp abutment surface which faces towards the lower clamp.

Each cutting member includes two side surfaces and a peripheral surface extending between the side surfaces, the peripheral surface has cutting portions and a peripheral abutment surface located between each pair of cutting portions.

When the tool assembly is in an assembled position, on each cutting member, one of the peripheral abutment surfaces abuts the elastic member, a second peripheral abutment surface abuts the protrusion abutment surface, and a third peripheral abutment surface abuts the upper clamp abutment surface.

BRIEF DESCRIPTION OF THE DRAWINGS

For a better understanding of the present invention and to show how the same may be carried out in practice, reference will now be made to the accompanying drawings, in which.

Figure 1:
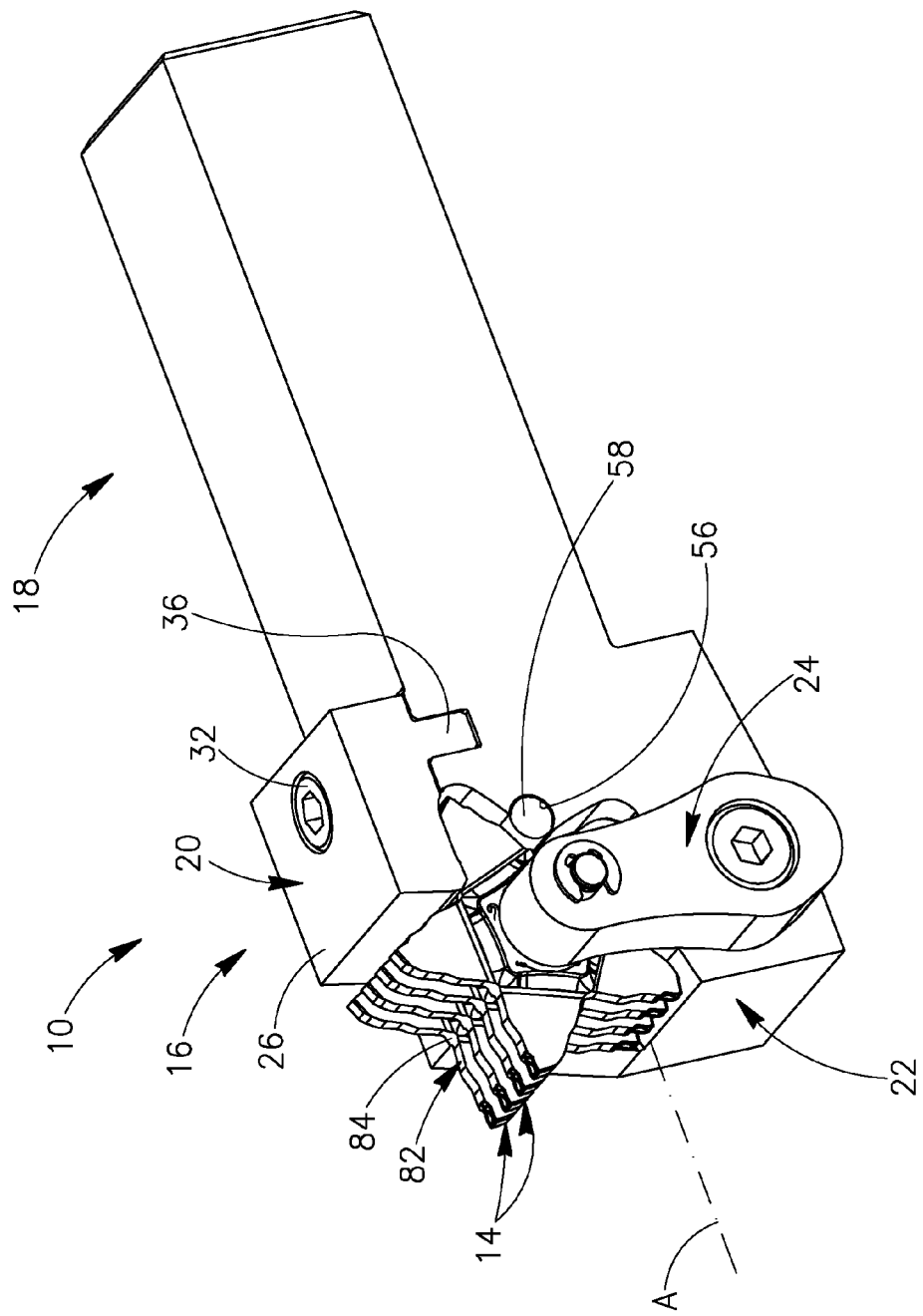
FIG. 1 is an isometric view of a tool assembly, according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
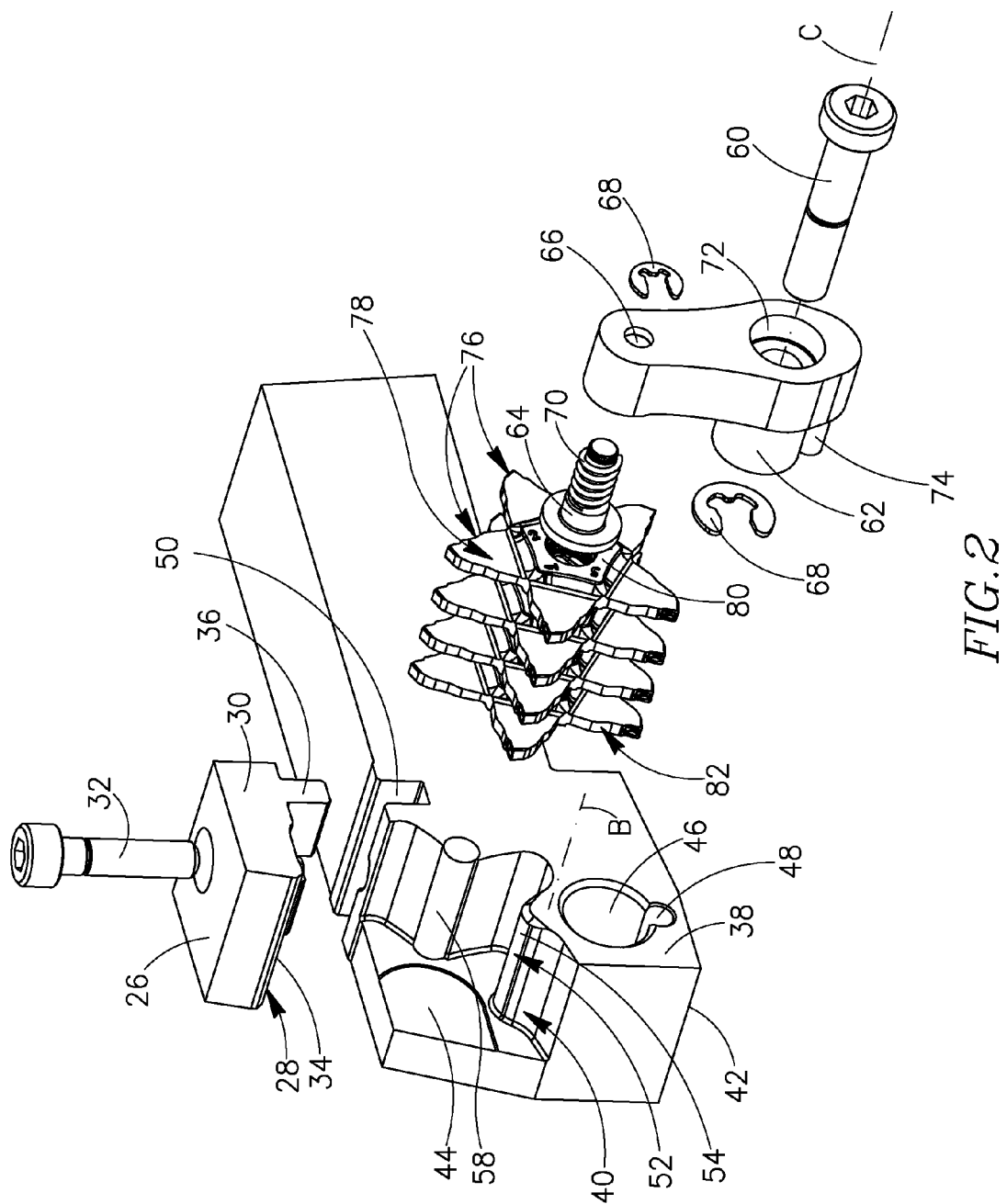
FIG. 2 is an exploded isometric view of the tool assembly of FIG. 1.
Figure 3:
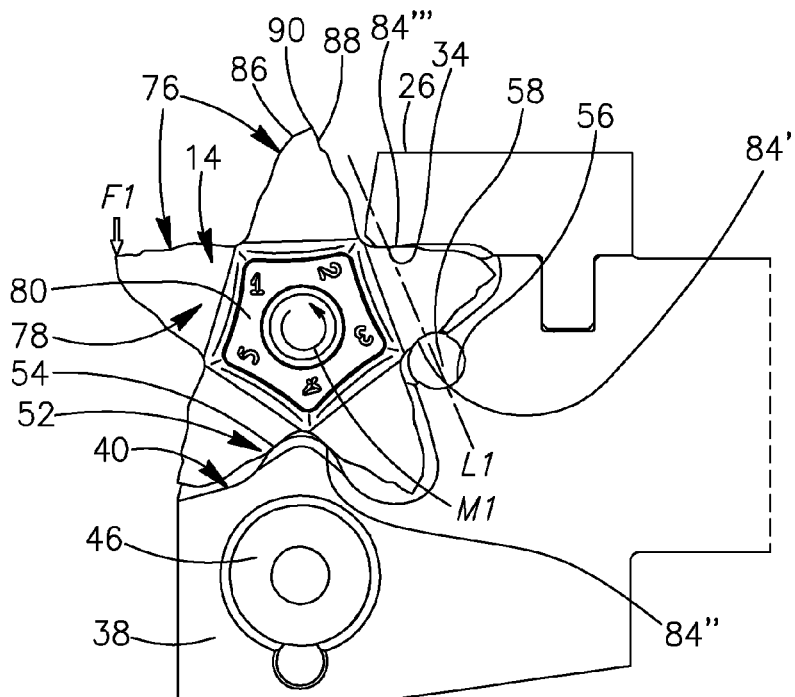
FIG. 3 is a side view of a tool holder with the side clamp removed to show the cutting inserts seated therein, according to embodiments of the present invention.

Reference is made to FIGS. 1 to 3, showing a multi-grooving tool assembly 10. The tool assembly 10 includes a tool holder 12 and a plurality of cutting members 14 which, according to some embodiments, are cutting inserts or cartridges for holding cutting inserts. Cutting inserts or cartridges will be referred to herein as cutting members. The tool holder 12 has longitudinal tool axis A, a clamping portion 16 located at a front end and a shank portion 18 extending rearwardly from the clamping portion 16. The clamping portion 16 includes upper and lower clamps 20, 22 and, according to some applications, a side clamp 24.

The upper clamp 20 has upper clamp top and bottom surfaces 26, 28 extending between upper clamp side surfaces 30 and may include an upper clamp screw 32 for securing the upper clamp 20 onto the lower clamp 22. The upper clamp bottom surface 28 may include an upper clamp abutment surface 34 adjacent the front end of the tool holder 12, facing the lower clamp 22. According to some embodiments, the upper clamp 20 includes an upper clamp guiding member 36 protruding from the upper clamp bottom surface 28.

According to some embodiments, the lower clamp 22 has two parallel lower clamp side surfaces 38 and lower clamp top and bottom surfaces 40, 42 extending therebetween. According to some applications, the lower clamp 22 has a sidewall 44 rising from the lower clamp top surface 40, which extends in the direction of the tool axis A and the lower clamp side surfaces 38. One of the lower clamp side surfaces 38 may include a guiding bore 46 and a fixation hole 48. The lower clamp top surface 40 may include a guiding recess 50 at a rear end of the lower clamp 22 for receiving the upper clamp guiding member 36. The lower clamp top surface 40 includes a longitudinal protrusion 52 at a forward end of the lower clamp 22 which is oriented perpendicularly to the tool axis A. The protrusion 52 has a protrusion axis B perpendicular to the tool axis A, and includes a protrusion abutment surface 54 which may have a convex cross sectional shape in a side view of the tool holder. In accordance with some embodiments, the lower clamp top surface 40 has an elastic member seat 56, located perpendicular to the tool axis A, between the protrusion 52 and the guiding recess 50. The elastic member seat 56 receives an elastic member 58. The elastic member is made of silicone or rubber, although any other desired material may be used. In some embodiments, the elastic member 58 may be cylindrical. Thus, the elastic member 58 is made of a material that is different from the material of which the upper and lower clamps 20, 22 are made.

According to some embodiments, the side clamp 24 has a generally elongated upright shape and includes a side clamp screw 60, a side clamp guiding member 62 and a side clamp abutment member 64. The side clamp abutment member 64 is located in a side clamp upper bore 66 located at an upper end of the side clamp 24. The side clamp abutment member 64 is held in the side clamp upper bore 66 by a retaining clip 68 and may include a spring 70, which in some embodiments may be a coiled compression spring. The spring 70 enables the side clamp abutment member 64 to press against the cutting members 14 and hold them together, so that they do not fall out of the pocket while the upper clamp 20 is lowered onto the cutting members 14. The side clamp guiding member 62 protrudes perpendicularly from a lower end of the side clamp 24 and is received in the guiding bore 46 of the lower clamp 22. The side clamp guiding member 62 has a through side clamp bottom bore 72, through which the side clamp screw 60 is inserted. According to some embodiments, the side clamp 24 has a fixation member 74 which protrudes from the side clamp 24, under the side clamp guiding member 62.

According to some embodiments, each of the cutting members 14 includes, but not limited to, five cutting portions 76, two parallel side surfaces 78 with side abutment surfaces 80 and a peripheral surface 82 which extends between the two side surfaces 78. The peripheral surface 82 has peripheral abutment surfaces 84 which may be designed to have a concave cross sectional shape, taken in a perpendicular direction to the side surfaces 78. This concave shape corresponds with the convex cross sectional shape of the protrusion abutment surface 54, so that when the cutting members 14 are seated on the protrusion 52, they may have a certain degree of freedom of rotation, with respect to the protrusion axis B. The cutting portions 76, according to some embodiments, are located in the peripheral surface 82 and separated from one another by the peripheral abutment surfaces 84. Each cutting portion 76 includes a relief surface 86 and a rake surface 88 which intersect at a cutting edge 90.

In accordance with some embodiments, when the tool assembly 10 is assembled, the cutting members 14 are seated side-by-side between the upper and lower clamps (20, 22), and each peripheral abutment surface 84 abuts the protrusion abutment surface 54. The side clamp screw 60 is tightened until the side clamp abutment member 64 starts to press against the row of cutting members 14. In this position the cutting members 14 are merely held together by the spring 70, preventing them from falling over, to allow the upper clamp 20 to be lowered. In some embodiments, this sideways, initial binding of the cutting members 14 may be performed by hand.

The upper clamp screw 32 is then tightened until the upper clamp abutment surface 34 and the elastic member 58 abut respective peripheral abutment surfaces 84 on each cutting member 14, with the upper clamp 20 applying a downwardly directed force on the peripheral abutment surfaces 84 it abuts. In this position, the elastic member 58 partially counters the downwardly directed force applied by the upper clamp 20, which couples, each respective peripheral surface 82 (of each cutting member 14), with the upper clamp abutment surface 34. The elastic member 58 is thus configured to bias the cutting member 14 in the direction of an abutment surface of a clamp (in this embodiment, the upper clamp abutment surface 34 of the upper clamp 20) along a line of force L1 which passes through the cutting member 14 and an abutment surface thereof (in this embodiment, a peripheral abutment surface 84 of the cutting member 14). Consequently, the elastic member 58 helps to accurately align the cutting members 14 with respect to one another. In other words, the bias applied by the elastic member 58 along the line of force L1 aligns the cutting members 14 by applying a moment M1 on the cutting members 14 in a direction of a moment created by cutting forces F1 (see FIG. 3).

It should be noted that at this stage, the side clamp screw 60 is not fully tightened and the side clamp abutment member 64 only applies a small sideways force on the cutting members 14. Consequently, the friction generated in between the cutting members 14 and the sidewall 44 is small enough, to allow the elastic member 58 to perform its aligning function.

When the tool assembly 10 is in an assembled position, the upper clamp screw 32 and the side clamp screw 60 are fully tightened. The upper clamp guiding member 36 is located in the guiding recess 50, the side clamp guiding member 62 is located in the guiding bore 46 and the fixation member 74 is located in the fixation hole 48. The upper clamp 20 presses down on the cutting members 14 against the protrusion 52, and the side clamp 24 binds the cutting members 14 together against the sidewall 44. The side abutment surfaces 80 abut one another, and the side abutment surfaces 80 of the outermost cutting members 14 abut the sidewall 40 and the side clamp abutment member 64. The fixation member 74 fixes the side clamp abutment member 64 at a certain rotational orientation with respect to a side clamp bottom bore axis C. According to some embodiments, for each cutting member 14, one peripheral abutment surface 84' abuts the elastic member 58, a second peripheral abutment surface 84" abuts the protrusion abutment surface 54 and a third peripheral abutment surface 84' abuts the upper clamp abutment surface 34.

Figure 4:
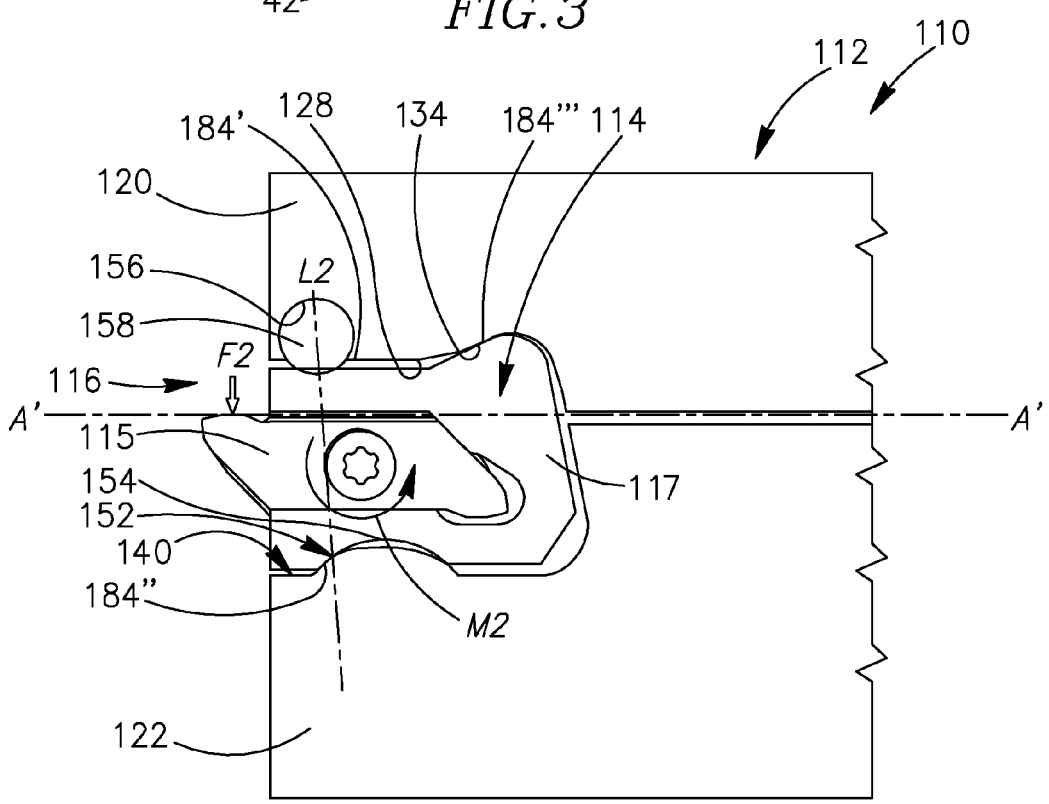
FIG. 4 is a side view of an embodiment of the tool assembly.

Attention is drawn to FIG. 4, showing a second embodiment according to the present invention. A tool assembly 110 has a tool holder 112 which includes a longitudinal tool axis A', a resilient upper clamp 120 and a lower clamp 122. The tool holder 112 has a clamping portion 116 provided with an elastic member seat 156 and an elastic member 158 located therein. The elastic member seat 156 is located in an upper clamp bottom surface 128 of the resilient upper clamp 120. The upper clamp bottom surface 128 has an upper clamp abutment surface 134. The lower clamp 122 has a lower clamp top surface 140 which includes a convex protrusion 152 with a protrusion abutment surface 154. The clamping portion 116 includes cutting members 114, each cutting member 114 comprising an insert holder 117 having a cutting insert 115 secured therein. Each cutting member 114 has peripheral abutment surfaces 184 that correspond to the shape of the protrusion abutment surface 154 of the lower clamp 122. In an assembled position, a first peripheral abutment surface 184' abuts the elastic member 158, a second peripheral abutment surface 184" abuts the protrusion abutment surface 154 and a third peripheral abutment surface 184''' abuts the upper clamp abutment surface 134.

The cutting members 114 of the present embodiment are clamped in the tool holder 112 similarly to the clamping method of the cutting members 14 in the tool holder 12 shown in FIGS. 1-3. Again, the elastic member 158 is configured to bias the cutting member 114 in the direction of an abutment surface of a clamp (in this embodiment, the protrusion abutment surface 154 of the lower clamp 122) along a line of force L2 which passes through the cutting member 114 and a peripheral abutment surface thereof (in this embodiment, a peripheral abutment surface 184 of the cutting member 114). Again, the bias along the line of force L2 applies a moment M2 on the cutting members 114, which moment M2 is in a direction of a moment created by cutting forces F2 acting on the cutting members (see FIG. 4).

Thus, in the embodiments of FIGS. 3 and 4, while the elastic member 58, 158 is located in one of the upper and lower clamps 20, 120, 22, 122, it biases the cutting members 14, 114 along a line of force L1, L2 in the direction of an abutment surface 34, 154 formed on the other of the upper and lower clamps 20, 120, 22, 122 in which the elastic member (14, 114) is not located.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A tool holder (12, 112) comprising a clamping portion (16, 116) capable of holding a plurality of cutting members (14, 114) seated in a side-by-side formation therein, wherein the clamping portion (16, 116) comprises:
   an upper clamp (20, 120);
   a lower clamp (22, 122) having a lower clamp top surface (40, 140) which comprises a protrusion (52, 152) with a protrusion abutment surface (54, 154); and
   an elastic member (58, 158) located in one of the upper and lower clamps (20, 120, 22, 122) and configured to simultaneously bias each of the plurality of cutting members (14, 114), when the plurality of cutting members (14, 114) are seated in the clamping portion (16, 116).

2. The tool holder (12, 112) according to claim 1, wherein the lower clamp (22, 122) has a sidewall (44) and the clamping portion (16) has a side clamp (24) for clamping the cutting members (14, 114) together against the sidewall (44).

3. The tool holder (12, 112) according to claim 1, wherein the protrusion abutment surface (54, 154) has a convex shape.

4. A tool holder (12, 112) comprising a clamping portion (16, 116) capable of holding a plurality of cutting members (14, 114) seated in a side-by-side formation therein, wherein the clamping portion (16, 116) comprises:
   an upper clamp (20, 120);
   a lower clamp (22, 122) having a lower clamp top surface (40, 140) which comprises a protrusion (52, 152) with a protrusion abutment surface (54, 154); and
   an elastic member (58, 158) located in one of the upper and lower clamps (20, 120, 22, 122); wherein:
   the elastic member (58, 158) is oriented perpendicular to a longitudinal tool axis (A, A').

5. A tool holder (12, 112) comprising a clamping portion (16, 116) capable of holding a plurality of cutting members (14, 114) seated in a side-by-side formation therein, wherein the clamping portion (16, 116) comprises:
   an upper clamp (20, 120);
   a lower clamp (22, 122) having a lower clamp top surface (40, 140) which comprises a protrusion (52, 152) with a protrusion abutment surface (54, 154); and
   an elastic member (58, 158) located in one of the upper and lower clamps (20, 120, 22, 122); wherein:
   the elastic member (158) is located in a resilient upper clamp (120).

6. The tool holder (12) according to claim 1, wherein the elastic member (58) is located in the lower clamp (20).

7. A tool holder (12, 112) comprising a clamping portion (16, 116) capable of holding a plurality of cutting members (14, 114) seated in a side-by-side formation therein, wherein the clamping portion (16, 116) comprises:
   an upper clamp (20, 120);
   a lower clamp (22, 122) having a lower clamp top surface (40, 140) which comprises a protrusion (52, 152) with a protrusion abutment surface (54, 154); and
   an elastic member (58, 158) located in one of the upper and lower clamps (20, 120, 22, 122); wherein:
   the elastic member (58, 158) is configured to bias each of the plurality of cutting members (14, 114) along a line of force (L1, L2) which passes through an abutment surface formed on the other of the upper and lower clamps (20, 120, 22, 122) in which the elastic member (14, 114) is not located, when the plurality of cutting members (14, 114) are seated in the clamping portion (16, 116).

8. The tool holder (12, 112) according to claim 7, wherein:
   the line of force (L1, L2) passes through said each cutting member (14, 114) and a peripheral abutment surface thereof.

9. The tool holder (12, 112) according to claim 7, wherein:
   the bias caused by the elastic member (58, 158) along the line of force (L1, L2) applies a moment (M1, M2) on each cutting member (14, 114), which moment (M1, M2) is in a direction of a moment created by a cutting force (F1, F2) acting on said each cutting member (14, 114).

10. The tool holder (112) according to claim 7, wherein:
    each cutting member (114) comprises an insert holder (117) having a cutting insert (115) seated therein.

11. The tool holder (12, 112) according to claim 7, wherein:
    the elastic member is made of a material that is different from the material of which the upper and lower clamps 20, 22 are made.

12. A tool assembly (10, 110) comprising a tool holder (12, 112) and a plurality of cutting members (14) seated in a side-by-side formation in a clamping portion (16) located at a forward end of the tool holder (12),
    the clamping portion (16) comprising upper and lower clamps (20, 120, 22, 122); an elastic member (58, 158) being located in one of the upper and lower clamps (20, 120, 22, 122); and the lower clamp (22, 122) having a lower clamp top surface (40) comprising a protrusion (52, 152) with a protrusion abutment surface (54, 154);
    the upper clamp (20, 120) comprising an upper clamp abutment surface (34, 134) facing towards the lower clamp (22, 122);
    each cutting member (14, 114) comprising two side surfaces (78) and a peripheral surface (82) extending between the side surfaces (78), the peripheral surface (82) having cutting portions (76) and a peripheral abutment surface (84, 184) located between each pair of cutting portions (76); wherein,
    when the tool assembly (10, 110) is in an assembled position, on each cutting member (14, 114), one of the peripheral abutment surfaces (84', 184') abuts the elastic member (58, 158), a second peripheral abutment surface (84", 184") abuts the protrusion abutment surface (54, 154), and a third peripheral abutment surface (84''', 184''') abuts the upper clamp abutment surface (34, 134).

13. The tool assembly (10, 110) according to claim 12, wherein the lower clamp (22, 122) has a sidewall (44) and the clamping portion (16) has a side clamp (24) for clamping the cutting members (14, 114) together against the sidewall (44).

14. The tool assembly (10, 110) according to claim 12, wherein the protrusion abutment surface (54, 154) has a convex shape.

15. The tool assembly (10, 110) according to claim 12, wherein the elastic member (58, 158) is oriented perpendicular to a longitudinal tool axis (A).

16. The tool assembly (110) according to claim 12, wherein the elastic member (158) is located in a resilient upper clamp (120).

\* \* \* \* \*